United States Patent [19]

Bendig

[11] 4,373,499
[45] Feb. 15, 1983

[54] VENTILATION CHECK VALVE FOR INTERNAL COMBUSTION ENGINES

[75] Inventor: Lothar Bendig, Ludwigsburg, Fed. Rep. of Germany

[73] Assignee: Filterwerk Mann & Hummel GmbH, Ludwigsburg, Fed. Rep. of Germany

[21] Appl. No.: 295,007

[22] Filed: Aug. 21, 1981

[30] Foreign Application Priority Data

Aug. 27, 1980 [DE] Fed. Rep. of Germany ....... 3032243

[51] Int. Cl.³ .......................................... F02M 27/00
[52] U.S. Cl. .................................. 123/574; 251/61.1; 137/110
[58] Field of Search .................. 123/574, 572, 573; 251/61.1; 137/110

[56] References Cited

U.S. PATENT DOCUMENTS

| | | | |
|---|---|---|---|
| 1,286,930 | 12/1918 | Buckner | 123/574 |
| 3,635,248 | 1/1972 | Klee | 251/61.1 |
| 3,754,538 | 8/1973 | Ephraim | 123/574 |
| 3,766,898 | 10/1973 | McMullen | 123/574 |

FOREIGN PATENT DOCUMENTS

| | | | |
|---|---|---|---|
| 7822216 | 7/1978 | Fed. Rep. of Germany. | |
| 1307283 | 4/1961 | France | 123/574 |
| 19482 | 6/1929 | Netherlands | 251/61.1 |

*Primary Examiner*—Ronald H. Lazarus
*Attorney, Agent, or Firm*—Joseph A. Geiger

[57] ABSTRACT

A suction-limiting check valve for a crankcase ventilating line which is connected to the engine intake downstream of the carburetor, the valve having two valve devices arranged for parallel operation, each including a spring-biased diaphragm which closes against a valve mouth at a predetermined level of negative pressure, one valve mouth being much smaller than the other to produce an earlier reopening of that valve device under elevated suction on the outlet side of the valve.

9 Claims, 2 Drawing Figures

VENTILATION CHECK VALVE FOR INTERNAL COMBUSTION ENGINES

BACKGROUND OF THE INVENTION

1. Field of the Invention

The present invention relates to pressure-limiting valves, and, more particularly, to a ventilation check valve which is adapted for use with an internal combustion engine to control the suction effect on a pollutant ventilating line which is connected to the engine intake.

2. Description of the Prior Art

It has become common practice, in connection with present-day intensified efforts to abate automobile-created pollution, to install fumes ventilation lines which draw otherwise freely escaping pollutants from the engine crankcase and from the fuel tank vent into the intake system of the internal combustion engine, where the pollutants become admixed to the combustion mixture of fuel and air.

For the effectiveness of ventilation and pollution abatement it depends whether a ventilation line is connected to the filter housing or to the manifold intake duct downstream of the carburetor. Obviously, the suction action on a ventilation line connected to the filter housing is much less than on a ventilation line which is connected to the manifold intake duct. On the other hand, the negative pressure in the manifold intake duct undergoes much wider fluctuations, from a moderate negative pressure at open-throttle operation to an elevated negative pressure, when the carburetor throttle is in its near-closed idle position. A ventilation connection to the filter housing has the additional disadvantage that, when the engine is at standstill, the filter housing is open to the atmosphere, via the filter cartridge and the intake snorkel, thereby permitting pollutants to escape to the atmosphere.

It has already been suggested in connection with vacuum-assisted ventilation lines to counter the problem of the pressure fluctuations in the vacuum source by installing in the ventilation line a check valve which blocks the line when a certain level of negative pressure is reached. Such a device is disclosed in the German Gebrauchsmuster (Utility Model) No. 78 22 216. This known check valve features a flexible diaphragm spaced a short distance from an intake opening which serves as a valve mouth inside a valve housing with inlet and outlet connectors for continuing portions of the ventilation line. The outer side of the diaphragm is exposed to atmospheric pressure, in opposition to a compression spring which applies an opening bias to the valve.

At a certain level of negative pressure in the ventilation line, the difference between the pressures on the diaphragm from inside the valve housing and from the atmospheric pressure outside is sufficient to overcome the valve-opening spring bias, so that the diaphragm moves progressively closer to the valve mouth while compressing the spring, until it finally interrupts the ventilation flow by closing the check valve.

This prior art check valve, in order to allow for an adequate ventilation flow at a low level of suction, i.e. when the internal combustion engine operates at full load with the carburetor throttle in the open position, requires a comparatively large diameter of the valve mouth. The size of the valve mouth, in turn, determines the force with which the suction in the outlet duct of the valve holds the diaphragm against the valve mouth. It follows that, when the suction in the outlet duct is strong, the negative pressure in the valve housing has to drop considerably below the point at which the valve first closed, before it reopens. Only a stronger spring and a correspoindingly larger diaphragm will reduce this difference in the opening and closing responses of the valve.

The described prior art check valve is thus poorly suited for use in a pollutant ventilation line which is subject to wide swings in negative pressure at the suction source, as is the case in a line which is connected to the manifold duct of the engine. For, even if this type of valve is balanced for closing at a median level of negative pressure, it will still remain closed much of the time, except at high power output levels of the engine.

SUMMARY OF THE INVENTION

Underlying the present invention is the primary objective of suggesting an improved ventilation check valve for pollutant ventilation lines of an internal combustion engine which, with a minimum of additional parts and space required, avoids the problems encountered with the earlier-described prior art check valve under conditions of widely differing levels of negative pressure applied to the ventilation line.

The present invention proposes to attain this objective by suggesting a ventilation check valve which has two valve mouths of unequal size cooperating with separate spring-biased diaphragms, so as to provide a maximum cross section for the ventilation flow at low negative pressures, a reduced flow cross section at intermediate negative pressures, and temporary complete closure of the check valve at elevated negative pressures, for a more even level of negative pressure upstream of the check valve.

In a preferred embodiment of the invention, the two valve mouths and cooperating diaphragms are arranged on opposite axial sides of a short cylindrical valve housing, in alignment with each other, the valve housing having circular end covers which retain and position the diaphragms. The connectors for the ventilation line extend radially from the valve housing, on opposite sides of the latter. The outlet connector which communicates with the valve mouth has a duct portion reaching to the center of the valve housing where it forms a "T" with two oppositely axially extending valve sockets whose open extremities form the valve mouths. Surrounding the two valve sockets are two compression springs which, while at least partially balancing each other with respect to their support pressure against the duct of the outlet connector, provide the opening bias for the two diaphragms. The two end covers of the valve housing have appropriate breather bores through which the diaphragm are exposed to atmospheric pressure.

The novel ventilation check valve is particularly suited for ventilation lines which connect the crankcase or the fuel tank vent to the manifold intake duct of the internal combustion engine, where the negative pressure which is applied to the ventilation line fluctuates between widely differing levels. The suggestion of two valve mouths with two cooperating diaphragms doubles the effective size of the diaphragm area in relation to the cross section of the valve mouths, without increasing the diameter of the valve housing. It also makes it possible to stagger the valve action, in the sense of arranging for the smaller valve mouth to close later than the larger valve mouth, so as to maintain a small ventilation flow at a suction level at which the valve would otherwise be closed.

Even in the case where the valve springs are adjusted for the simultaneous closing of both valve mouths, the novel valve still offer the advantage of a much earlier reopening of the smaller valve, because of the greatly reduced suction force acting on the diaphragm at the small valve mouth.

The check valve of the invention does not require any particular mounting arrangement, being conveniently interposable at any point in a ventilation line. This advantage is further enhanced by the radial alignment of the inlet and outlet connectors at the valve housing.

BRIEF DESCRIPTION OF THE DRAWING

Further special features and advantages of the invention will become apparent from the description following below, when taken together with the accompanying drawing which illustrates, by way of example, a preferred embodiment of the invention which is represented in the various figures as follows.

DESCRIPTION OF THE PREFERRED EMBODIMENT

Figure 1:
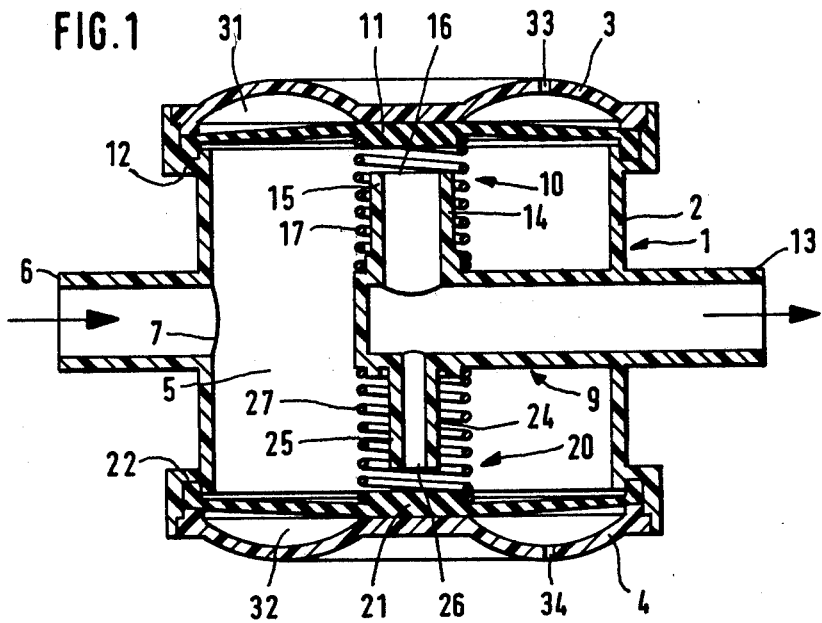
FIG. 1 shows, in a longitudinal cross section, a ventilation check valve embodying the present invention.
Figure 2:
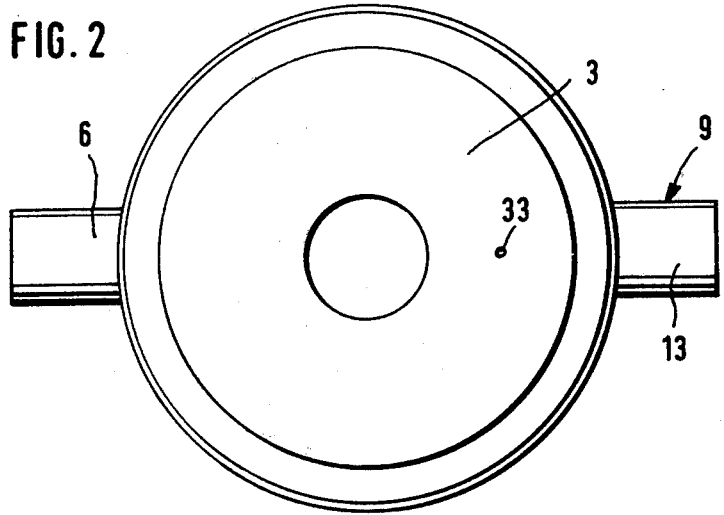
FIG. 2 shows the valve of FIG. 1 in a plan view.

The drawing shows a check valve 1 which is designed for installation in a pollutant ventilation line connecting the manifold intake duct of an internal combustion engine to its crankcase, for example. The check valve 1 consists essentially of a valve housing 2 in the form of a hollow cylinder whose axial ends carry circular housing end covers 3 and 4. This valve housing encloses a valve chamber 5 to which is connected an inlet connector 6, at an inlet port 7 which is located at mid-length of the valve housing. Diametrally opposite the inlet connector 6 is arranged an outlet duct 9 which starts at the center of the valve chamber 5 and ends in the form of an outlet connector 13 on the outside of the valve housing 2.

Inside the valve chamber 5, on opposite sides of the outlet duct 9 and in alignment with the longitudinal axis of the valve housing 2, are arranged two valve devices 10 and 20. The first valve device 10 includes a first diaphragm 11 which serves as the movable valve body, forming a portion of the wall of the valve chamber 5. The diaphragm 11 has a circular rim by which it is retained and centered in a rim groove 12 of the valve housing 2 with the aid of the housing end cover 3.

Facing the center of the first diaphragm 11 is a valve socket 14 of large diameter which extends in concentric alignment with the valve housing 2, opening into the outlet duct 9. The free extremity or mouth portion 15 of the valve socket 14 forms a planar large valve mouth 16 which serves as a valve seat in cooperation with the first diaphragm 11. Surrounding the large valve socket 14 is a first valve spring 17 which is preloaded under compression, resting with one extremity against the outlet duct 9 and biasing the first diaphragm 11 axially outwardly against an abutment face of the end cover 3 with the other extremity.

Axially opposite the described first valve device 10 is arranged a second valve device 20 which consists of similar components. They include a second diaphragm 21 which is centered and retained in a rim groove 22 of the valve housing 2 by means of the housing end cover 4. Extending from the central outlet duct 9 in the opposite direction of the large valve socket 14 is a small valve socket 24 with a distal mouth portion 25 forming a small valve mouth 26 at a distance from the second diaphragm 21. The latter and the valve mouth 26 serve as the movable valve member and the cooperating valve seat, respectively. A second valve spring 27 surrounds the small valve socket 24, having one extremity supported against the outlet duct 9 and biasing the second diaphragm 21 axially outwardly against an abutment face of the end cover 4 with the other extremity.

The first and second diaphragms 11 and 21 form movable wall portions of the valve chamber 5, having their outer sides exposed to the atmospheric pressure which is present in the air spaces 31 and 32 between the diaphragm 11 and 21 and their end covers 3 and 4, respectively. Two breather bores 33 and 34 connect the air spaces 31 and 32 to the outside.

The area of the small valve mouth 26 is preferably one-sixth the size of the area of the large valve mouth 16. The two diaphragms 11 and 21 and the two valves springs 17 and 27, as well as the housing end covers 3 and 4 are preferably identical and therefore interchangeable. It follows that, if both valve springs are under the same compression preload, both diaphragms close against their respective valve mouths at the same increasing level of negative pressure in the valve chamber 5.

On the other hand, it should be understood that the present invention also provides for the possibility of adjusting the two valve devices to close at different levels of increasing negative pressure, as a result of a stronger second valve spring 27, for example. In this case, the second valve device 20 will stay open longer than the first valve device, until, at a predetermined higher level of negative pressure in the valve chamber, both valve devices are closed. This same result can also be achieved with identical first and second valve springs, by providing a higher compression preload on the second valve spring, as a result of an axially shifted spring seat on the outlet duct 9, for example.

The inlet connector 6 and the outlet connector 13 are preferably arranged to extend radially from diametrally opposite points on the valve housing 2 so as to be in line with each other. The large and small valve sockets 14 and 24, respectively, form a T-connector with the outlet duct 9 in the center axis of the valve chamber 5. This configuration makes it possible to produce the valve housing 2 and the connectors 6 and 13, as well as the valve sockets 14 and 24, as a single injection-molded part. Only the valve springs 17 and 27 are not molded. The valve is assembled permanently and requires no maintenance.

In practical use, the check valve of the invention may be stalled in a ventilation line which connects the crankcase of the internal combustion engine to its manifold intake duct, thereby drawing pollutants from the crankcase through the ventilation line (not shown) and through the ventilation check valve of FIG. 1 in the direction of the arrows in FIG. 1. The requirements for effective pollutant abatement may call for the crankcase to be subjected to a negative pressure during engine operation of 2 millibar, in order to prevent the escape of pollutants through the crankcase vent to the atmosphere. An additional requirement may prescribe that the specified negative pressure is not to be exceeded substantially, in order to prevent the aspiration of foreign particles into the crankcase through leaking seals and other gas entry points around the crankcase.

At a predetermined level of negative pressure in the valve chamber 5, the difference between the pressures on the inner and outer sides of the two diaphragms 11 and 21 starts to exceed the opening bias applied to the diaphragms by their valve springs 17 and 27, so that the diaphragms move closer to their respective valve mouths 16 and 26. As the negative pressure increases further, both diaphragms 11 and 21 close against their valve mouths 16 and 26, respectively, further compressing the springs 17 and 27. In this state, the negative pressure in the outlet duct 9 acts on the first diaphragm over the area of the large valve mouth 16, and on the second diaphragm 21 over the area of the small valve mouth 26. This negative pressure, as determined by the suction in the manifold intake duct of the engine, may reach as much as 800 millibar.

Due to the much smaller area of the small valve mouth 26, the second valve spring 27 will very quickly reopen the second valve device 20, when the negative pressure in the valve chamber 5 falls back below the level at which the two valve devices closed initially. At this point, the combination of the remaining suction effect of the large valve mouth 16 on the first diaphragm 11 and the increase in negative pressure inside the valve chamber 5, due to the opening of the second valve device 20, combine to maintain the first diaphragm 11 in contact with the valve mouth 16 until, following a further reduction of the negative pressure in the outlet duct 9, the large valve mouth 16 is likewise opened, as the first valve spring 17 moves the first diaphragm 11 against the end cover 3. This condition reflects a low negative pressure in the manifold intake duct of the engine, which is characteristic of an engine operation at full or nearly full load.

It should be understood, of course, that the foregoing disclosure describes only a preferred embodiment of the invention and that it is intended to cover all changes and modifications of this example of the invention which fall within the scope of the appended claims.

I claim the following:

1. A suction-limiting check valve adapted for use in a pollutant ventilation line of an internal combustion engine which supplies negative pressure of differing levels to the ventilation line, as when the engine crankcase is to be ventilated into the engine intake duct downstream of the carburetor throttle, the check valve comprising in combination:

a valve housing enclosing a valve chamber, the valve housing having an inlet connectable to a space which is to be ventilated and an outlet connectable to a source of variable negative pressure;

first and second diaphragms forming hermetic flexible wall portions of the valve chamber, each diaphragm being circumferentially restrained and having at least a major portion of its outer surface exposed to atmospheric pressure;

first and second diaphragm biasing means applying a bias force to the respective diaphragms in opposition to the atmospheric pressure on their outer surface;

first and second diaphragm abutment means limiting the outward deflection of the respective diaphragms by the diaphragm biasing means, thereby defining diaphragm rest positions; and first and second valve sockets communicating with the valve housing outlet and defining first and second valve mouths facing a central portion of the inner surface of the respective diaphragms, at an opening distance from the diaphragms in their rest position; and wherein the first and second diaphragms and their respective biasing means and abutment means cooperate with the first and second valve mouths to form first and second valve devices in a parallel-operating relationship, each valve device responding independently to changes in the negative pressure in the valve chamber and in the housing outlet by closing at a predetermined level of increasing negative pressure in the valve chamber and by reopening at predetermined combined levels of decreasing negative pressure in the valve chamber and in the housing outlet, whereby the closing pressure level in the valve chamber differs from the reopening pressure level as a function of the area of the valve mouth and the level of negative pressure in the housing outlet;

the closing and reopening responses of the first and second valve devices; as determined by their respective diaphragms, diaphragm biasing and abutment means and the opening area and opening distance of their respective valve mouths, are unequal with regard to the levels of negative pressure in the valve chamber.

2. A check valve as defined in claim 1, wherein the first and second valve devices close at substantially the same level of increasing negative pressure in the valve chamber, the inequality of response residing in an earlier reopening of the second valve device under decreasing negative pressure in the housing outlet, as a result of a smaller opening area of the second valve mouth in relation to the surrounding inner surface area of the second diaphragm in the closed position, as compared to the opening area of the first valve mouth in relation to the surrounding inner surface area of the first diaphragm in the closed position.

3. A check valve as defined in claim 1, wherein the first and second valve devices have substantially identical diaphragms, diaphragm biasing means, and diaphragm abutment means, for a valve closing response at substantially the same level of increasing negative pressure in the valve chamber; and the opening area of the second valve mouth is smaller than the opening area of the first valve mouth, for an earlier valve reopening response of the second valve device under decreasing negative pressure in the valve chamber and elevated negative pressure in the housing outlet.

4. A check valve as defined in claim 1, wherein the first and second valve devices have substantially identical diaphragms;

the diaphragm biasing means of the second valve device exerts a stronger opening bias on the second diaphragm than the opening bias which is exerted by the first diaphragm biasing means on the diaphragm of the first valve device, thereby producing a later closing response of the second valve device under increasing negative pressure in the valve chamber and a correspondingly earlier reopening response of the second valve device under decreasing negative pressure in the valve chamber.

5. A check valve as defined in claim 4, wherein the opening area of the second valve mouth is smaller than the opening area of the first valve mouth, for a still earlier reopening response of the second valve device under decreasing negative pressure in the valve chamber and elevated negative pressure in the housing outlet.

6. A check valve as defined in any one of claims 1 and 3 through 6, wherein the valve housing includes a generally cylindrical main portion, having two connectors on the outside thereof serving as the housing inlet and housing outlet, respectively;

the outlet connector is part of an outlet duct which extends to the center of the valve housing;

the first and second valve sockets are generally tubular formations communicating with and extending in opposite axial directions from the outlet duct in the center of the valve housing, the first and second valve mouths being the distal axial ends of the respective valve sockets;

the first and second diaphragms are circular members forming flexible end walls on opposite axial sides of the housing main portion which are retained by circular housing end covers; and the first and second diaphragm biasing members are first and second compression-type valve springs surrounding the first and second valve sockets and pressing axially outwardly against the first and second diaphragms, respectively.

7. A check valve as defined in claim 6, wherein the first and second diaphragms and the first and second valve springs are identical and interchangeable; and the opening area of the second valve mouth is a fraction of the opening area of the first valve mouth.

8. A check valve as defined in claim 7, wherein the first and second valve springs and the opening distances of the first and second diaphragms are so arranged that the second valve spring, in the closed position of the second diaphragm, exerts on the latter a higher opening force than the opening force exerted on the closed first diaphragm by the first valve spring.

9. A check valve as defined in claim 6, wherein the housing end covers serve as the first and second diaphragm abutment means, forming air spaces axially outside the first and second diaphragm which are open to the atmosphere through breather bores in the end covers; and the inlet and outlet connectors are diametrally oppositely aligned and radially oriented tubular extensions of the main portion of the valve housing.

* * * * *